United States Patent [19]

Irifune et al.

[11] Patent Number: 5,118,723

[45] Date of Patent: Jun. 2, 1992

[54] RADIATION-CURABLE ORGANOPOLYSILOXANE-CONTAINING COMPOSITION

[75] Inventors: Shinji Irifune; Toshio Ohba; Yasuaki Hara; Masanao Kamei, all of Gunma, Japan

[73] Assignee: Shin-Etsu Chemical Company, Limited, Tokyo, Japan

[21] Appl. No.: 651,854

[22] Filed: Feb. 7, 1991

[30] Foreign Application Priority Data

Feb. 8, 1990 [JP] Japan .................................. 2-29236

[51] Int. Cl.$^5$ ...................... C08F 283/12; C08F 30/08
[52] U.S. Cl. ..................................... 522/99; 525/479; 526/279; 526/323.1
[58] Field of Search ..................... 522/99; 525/479; 526/279, 323.1

[56] References Cited

U.S. PATENT DOCUMENTS

| | | | |
|---|---|---|---|
| 4,201,808 | 5/1980 | Cully et al. | 522/99 |
| 4,355,147 | 10/1982 | Deichert et al. | 522/99 |
| 4,617,238 | 10/1986 | Crivello et al. | 522/99 |
| 4,640,849 | 2/1987 | Woods et al. | 522/99 |
| 4,678,846 | 7/1987 | Weitemeyer et al. | 522/99 |
| 4,952,657 | 8/1990 | Riding et al. | 522/99 |
| 5,075,349 | 12/1991 | Ohba et al. | 522/99 |

FOREIGN PATENT DOCUMENTS 0229033 7/1987 European Pat. Off. .............. 522/99

Primary Examiner—Marion E. McCamish
Assistant Examiner—Susan Berman
Attorney, Agent, or Firm—Millen, White, Zelano

[57] ABSTRACT

A radiation curable organopoiysiloxane-containing composition is disclosed which is curable by the irradiation with actinic rays in a relatively low dose to give a cured layer having excellent surface-releasability so that the composition is useful, for example, as a coating agent of release paper for temporary protection of adhesive surface. the composition comprises (a) 0.1 to 20 parts by weight of a linear organopolysiloxane having at least one vinylphenyl or isopropenylphenyl group bonded to only one of the terminal silicon atoms in the molecular chain and (b) 99.9 to 80 parts by weight of a (meth)acrylate compound which is a (meth)acrylic acid ester of a polyhydric alcohol or a polyester of a polyhydric alcohol and a dibasic carboxylic acid esterified with (meth)acrylic acid at the residual hydroxy groups.

6 Claims, No Drawings

RADIATION-CURABLE ORGANOPOLYSILOXANE-CONTAINING COMPOSITION

BACKGROUND OF THE INVENTION

The present invention relates to a radiation-curable organopolysiloxane-containing composition or, more particularly, to a radiation-curable organopolysiloxane-containing composition capable of being cured by the irradiation with a relatively small dose of radiation to give a cured film having high surface releasability from an adhesive or a sticky substance so as to be useful as a surface-releasing coating composition such as a back-surface treating agent of a pressure-sensitive adhesive tape manufactured in rolls or a surface-treating agent of a release paper sheet used for temporary protection of pressure-sensitive adhesive labels, stickers and the like.

It is known that a surface-releasing coating composition mentioned above is formulated with a silicone or an organopolysiloxane compound as a releasability-imparting ingredient in the composition by virtue of the unique surface property of the organopolysiloxane as cured. Such a surface-releasing coating composition is applied to the surface of a substrate sheet, e.g., paper, and cured by the irradiation with actinic rays such as electron beams, ultraviolet light and the like to give a cured surface-releasing film on the substrate. For example, Japanese Patent Publication No. 52-3190 teaches a silicone-containing surface-releasing coating composition curable by the irradiation with electron beams, of which the organopolysiloxane has (meth)acryloxy, i.e. acryloxy or methacryloxy, groups in a molecule with an organic polymer as the base ingredient. Further, Japanese Patent Publication No. 53-36515 discloses an ultraviolet-curable surface-releasing coating composition comprising an organopolysiloxane of the above mentioned type and a photosensitizer.

A problem in the silicone-containing surface-releasing coating composition of the above mentioned type consists in the difficulty in obtaining a good balance between the radiation-curability of the organopolysiloxane and the surface-releasability to be exhibited by the cured organopolysiloxane. Namely, the content of the (meth)acryloxy groups in the organopolysiloxane molecules should be increased as high as possible when high radiation-curability is desired while an increase in the content of the (meth)acryloxy groups is unavoidably accompanied by a decrease in the surface-releasability of the cured composition as a consequence of the high polarity of the (meth)acryloxy groups in addition to the disadvantage that the storage stability of the composition is decreased.

With an object to solve the above mentioned problem by increasing the surface-releasability, Japanese Patent Publication No. 62-30234 proposes a method in which the silicone-containing surface-releasing coating composition is admixed with a diorganopolysiloxane of a relatively high molecular weight having a linear molecular structure. Such a composition, however, has another problem that, when a pressure-sensitive adhesive tape or sheet temporarily protected with the release paper is peeled off therefrom, the adhesiveness on the adhesive surface is remarkably decreased, especially, when the coating layer has been cured with a small irradiation dose of electron beams.

On the other hand, Japanese Patent Publication No. 57-57096 proposes, with an object to improve both of the radiation-curability and adhesiveness retention, a radiation-curable silicone-containing surface-releasing coating composition comprising a (meth)acryloxy group-containing organopolysiloxane and a (meth)acrylate ester of a polyfunctional alcoholic compound or a low molecular weight organopolysiloxane having (meth)acryloxy groups. Although this composition is satisfactory in respect of the radiation-curability of adhesiveness retention, a problem left therein is that the surface releasability of the radiation-cured layer of the composition is not quite high with a relatively large resistance against peeling of a release paper sheet prepared with the composition from an adhesive surface.

SUMMARY OF THE INVENTION

The present invention accordingly has an object to provide a novel radiation-curable organopolysiloxane-containing composition suitable for use as a surface-releasing coating composition without the above described problems and disadvantages in the radiation-curable organopolysiloxane-containing surface-releasing coating compositions in the prior art.

Thus, the radiation-curable organopolysiloxane-containing composition of the present invention comprises, as a uniform mixture:

(a) from 0.1 to 20 parts by weight of an organopolysiloxane of a linear molecular structure having one, two or three of vinylphenyl or isopropenylphenyl groups bonded to only one of the silicon atoms at the molecular chain ends thereof; and (b) from 90.9 to 80 parts by weight of a (meth)acrylate compound represented by the general formula $$(CH_2=CR^2-CO-O-)_a R^1. \qquad (I)$$

in which $R^2$ is a hydrogen atom or a methyl group, $R^1$ is an $a$-valent group formed from a molecule of a polyhydric alcohol, ester of a polyhydric alcohol with a polybasic carboxylic acid or a partial ester of a polyhydric alcohol with a fatty acid by removing $a$ in number of the hydrogen atoms of the alcoholic hydroxy groups and $a$ is an integer of 1 to 6.

DETAILED DESCRIPTION OF THE PREFERRED EMBODIMENTS

The inventors have continued extensive investigations with an object to develop a novel radiation-curable organopolysiloxane-containing composition suitable for use as a surface-releasing coating composition without the problems and disadvantages in the radiation-curable organopolysiloxane-containing surface-releasing coating compositions in the prior art and got an idea in the course of their investigations that the drawbacks in the composition disclosed in Japanese Patent Publication No. 57-57096 recited above is presumably a consequence of the fact that the (meth)acryloxy groups in the organopolysiloxane are distributed evenly or at random positions throughout the organopolysiloxane molecules so that the drawback thereof could be removed by using an organopolysiloxane in which the (meth)acryloxy groups are bonded only to a silicon atom at a localized position or, in particular, at one of the molecular chain ends leading to completion of the present invention on the base of this unique idea. Indeed, the organopolysiloxane-containing composition of the invention is highly curable by the irradiation with a relatively small dose of actinic rays to give a cured layer exhibiting extremely high surface releasability but still free from the problem of the decrease in the adhesiveness of the pressure-sensitive adhesive sheet peeled off from the releasing surface of the cured layer of the composition.

In addition to the above mentioned advantages, the releasability of the surface of a cured layer of the composition can be freely and reproducibly controlled by suitably selecting the proportion of the components (a) and (b) and the composition of the invention is very stable under storage over a long period of time. Since the surface of the cured layer of the composition has slipperiness, the composition is useful as a coating composition in the preparation of slip-sheets. Furthermore, surprisingly firm adhesion can be obtained between the radiation-cured layer of the inventive composition and the surface of a substrate on which the composition has been radiation-cured regardless of the material of the substrate on which no firm adhesion could be obtained in the prior art with the coating composition applied thereon including thermoplastic resins such as polyethylene, polypropylene, poly(ethylene terephthalate), poly(vinyl chloride) and the like and metals such as aluminum, steel, nickel and the like. In addition, the cured layer of the composition has flexibility, heat resistance, light-fastness and water resistance as good as or even better than a coating layer formed from a poly(meth)acrylate alone.

The component (a) in the inventive composition is an organopolysiloxane of a linear molecular structure having one, two or three of vinylphenyl or isopropenylphenyl groups or, preferably, 4-vinylphenyl or 4-isopropenylphenyl groups bonded to only one of the silicon atoms at the molecular chain ends thereof, the silicon atoms at the other molecular chain end and intermediate position in the molecular chain having no such groups, and serves to impart releasability to the surface of a cured layer of the composition. When the organopolysiloxane has no vinylphenyl or isopropenylphenyl groups, bleeding of the organopolysiloxane out of the cured layer of the composition would be increased so that a disadvantage is caused that the adhesiveness retention of the adhesive surface peeled off from the cured layer of the composition is remarkably decreased though advantageous in respect of the releasability.

It is essential that, when the organopolysiloxane has two or three (meth)acryloxy groups in a molecule, they are bonded to only one of the silicon atoms at the molecular chain ends. When the (meth)acryloxy groups are bonded to the silicon atoms at random positions or to each of the terminal silicon atoms, the organopolysiloxane molecules under irradiation with actinic rays would be firmly polymerized or crosslinked in the polymerized phase of the component (b) leaving no freely mobile organopolysiloxane segments. In other words, the component (a), when irradiated with actinic rays, would be copolymerized with the component (b) and fixed only at one end of the molecule while the siloxane segments extending oppositely from the (meth)acryloxy groups are left freely mobile on the surface of the cured layer thus contributing to the enhancement of the surface releasability.

The organopolysiloxane as the component (a) can be prepared, for example, by the following procedure. Thus, in the first place, a hexaorganocyclotrisiloxane represented by the general formula $(-R_2Si-O-)_3$, in which R is a monovalent hydrocarbon group, e.g., hexamethyl cyclotrisiloxane, is subjected to the reaction of ring-opening polymerization in the presence of a triorganosilanol of the general formula $R_3SiOH$, in which R has the same meaning as defined above, e.g., trimethyl silanol, and a catalyst which is a penta-coordinate organosilicon compound expressed by the formula

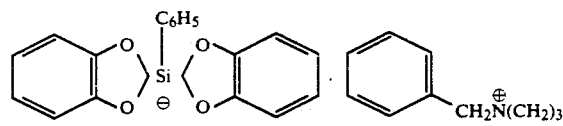

to give a one-end silanol-terminated organopolysiloxane represented by the general formula $$R_3Si-O-(-SiR_2-O-)_n-SiR_2-OH. \quad (II)$$

in which R has the same meaning as defined above and n is a positive integer. The monovalent hydrocarbon group denoted by R is exemplified by alkyl groups such as methyl, ethyl, propyl, butyl and octyl groups, alkenyl groups such as vinyl and allyl groups and aryl groups such as phenyl and tolyl groups as well as those substituted monovalent hydrocarbon groups obtained by replacing a part or all of the hydrogen atoms in the above named unsubstituted hydrocarbon groups with halogen atoms, cyano groups and the like such as chloromethyl, 2-cyanoethyl and 3,3,3-trifluoropropyl groups. Two or more different kinds of these groups can be contained in the one-end silanol-terminated organopolysiloxane of the above given formula (II) although it is preferable that at least 80% by moles of the groups denoted by R are methyl groups in respect of the good surface releasability exhibited thereby. The value of n depends on the molar proportion of the hexamethyl cyclotrisiloxane and triorganosilanol in the reaction mixture. When an organopolysiloxane having a larger degree of polymerization is desired, namely, the molar proportion of the former to the latter is increased accordingly.

In the next place, the above obtained one-end silanol-terminated organopolysiloxane of the formula (II) is subjected to a dehydrochlorination reaction with a triorgano chlorosilane represented by the general formula $$Cl-SiR^3{}_bR_{3-b}, \quad (III)$$

in which R has the same meaning as defined above, $R^3$ is a vinylphenyl or isopropenylphenyl group or, preferably, a 4-vinylphenyl or isopropenylphenyl group and b is 1, 2 or 3, in the presence of a hydrogen chloride acceptor such as amine compounds to give the desired organopolysiloxane represented by the general formula $$R_3Si-O-(-SiR_2-O-)_n-SiR_2-O-SiR^3{}_bR_{3-b}. \quad (IV)$$

Types of the organopolysiloxane suitable as the component (a) include those represented by the following general formulas:

$$R_3Si-O-(-SiR_2-O-)_n-SiR_2-O-SiR_2R^3;$$

$$R_3Si-O-(-SiR_2-O-)_n-SiR_2-O-SiRR^3{}_2;$$

$$R_3Si-O-(-SiR_2-O-)_n-SiR_2-O-SiR^3{}_3;$$

$$[R_3Si-O-(-SiR_2-O-)_n-]_3SiR^3; \text{ and}$$

$$R_3Si-O-Si(O-SiR_3)_2-O-(-SiR_2-O-)_n-SiR_2-O-SiR_2R^3.$$

in which each symbol has the same meaning as defined above, though not particularly limitative thereto.

It is preferable that the organopolysiloxane as the component (a) has a degree of polymerization in the range from 3 to 100 or, preferably, from 9 to 60. When the degree of polymerization thereof is too small, the surface releasability of the cured layer of the composition would be undesirably low while, when the degree of polymerization thereof is too large, a disadvantage is caused that retention of the adhesiveness in the adhesive surface peeled off from the cured layer of the composition would be somewhat decreased.

The component (b) compounded with the above described component (a) to form the inventive composition is a (meth)acrylate compound which serves to impart the composition with good radiation-curability and adhesiveness of the cured layer of the composition to the substrate surface on which the composition has been cured. The (meth)acrylate compound is represented by the general formula $(CH_2=CR^2-CO-O-)_a R^1$, in which $R^2$ is a hydrogen atom or a methyl group, $R^1$ is an $\alpha$-valent group formed from a molecule of a polyhydric alcohol, ester of a polyhydric alcohol with a polybasic carboxylic acid or partial ester of a polyhydric alcohol with a fatty acid by removing $\alpha$ in number of the hydrogen atoms of the alcoholic hydroxy groups and $\alpha$ is an integer of 1 to 6.

Examples of the (meth)acrylate compound defined above and suitable as the component (b) include 2-n-butoxyethyl acrylate, diethylene glycol diacryalte, tetraethylene glycol diacrylate, trimethylolpropane triacrylate, trimethylolpropane trimethacrylate, pentaerythritol triacrylate, pentaerithritol trimethacrylate, pentaerythritol tetraacrylate, dipentaerythritol pentaacrylate, dipentaerythritol hexaacrylate and the like though not particularly limitative thereto.

The organopolysiloxane-containing composition of the present invention can be prepared by uniformly blending the above described components (a) and (b) each in a specified amount. The weight proportion of these components should be such that from 0.1 to 20 parts by weight or, preferably, from 3 to 10 parts by weight of the component (a) are blended with from 99.9 to 80 parts by weight or, preferably, from 97 to 90 parts by weight of the component (b) although the exact mixing ratio depends on the desired radiation-curability of the composition, surface releasability and adhesion to the substrate surface of the cured composition and other factors. When the amount of the component (a) is too small, no sufficient surface-releasability can be imparted to the cured layer of the composition. An excessively large amount of the component (a) would cause a disadvantageous decrease in the radiation-curability of the composition and adhesion strength of the cured layer of the composition to the substrate surface.

It is optional that the inventive composition comprising the components (a) and (b) further contains various known additives according to need including, for example, organic solvents to improve the workability in the coating works of the composition, levelling agents, antistatic agents, defoaming agents, pigments and the like. When curing of the inventive composition is intended by using ultraviolet light as the actinic rays, the composition should preferably be admixed with a photosensitizer or photopolymerization initiator such as benzophenone, 4-chlorobenzophenone, 4,4-dimethoxy benzophenone, acetophenone, benzoin methyl ether, benzoin trialkylsilyl ethers and the like in a suitable amount.

The inventive composition prepared in the above described manner can be used as a back-surface treatment agent of pressure-sensitive adhesive tapes manufactured in rolls, protecting coating agent on metal-made or plastic-made articles, vehicle of a surface-releasing coating compositions and the like. When the composition is used as a coating material on release paper or sheet, the composition is evenly applied to the surface of paper, plastic films, metal, e.g., aluminum, foils and the like by using a suitable coating machine such as bar coaters, gravure coaters, reverse coaters and the like in a thickness of, for example, 0.1 to 200 μm followed by the irradiation with actinic rays to effect curing of the composition.

Various kinds of actinic rays can be used for the purpose of curing the inventive composition including electron beams from an electron accelerator, X-rays from an X-ray apparatus, $\alpha$-, $\beta$- and $\gamma$-rays from a radioisotope, ultraviolet light from mercury arc lamps, medium- and high-pressure mercury lamps and the like, and so on. When electron beams are used as the actinic rays, an irradiation dose of 3 to 5 Mrads is usually sufficient to cure the composition. When ultraviolet light is used, an irradiation time of 0.1 to 10 seconds is usually sufficient to fully cure the inventive composition admixed with a suitable amount of a photosensitizer using a high-pressure mercury lamp of 2 kilowatt output placed at a distance of 8 cm from the irradiated surface.

In the following, the inventive composition is described in more detail by way of examples preceded by a description of the synthetic procedure for the preparation of the one-end functional organopolysiloxane used as the component (a). In the following description, the term of "parts" always refers to "parts by weight" and the values of viscosity are all those obtained by the measurement at 25° C.

PREPARATION OF ORGANOPOLYSILOXANE I

Into a four-necked flask of 1 liter capacity were introduced 666 g (3 moles) of hexamethyl cyclotrisiloxane, 90 g (1 mole) of trimethyl silanol and 0.1 g of a pentacoordinate organosilicon compound of the formula

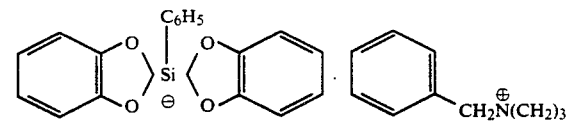

to form a reaction mixture which was agitated for 16 hours at 80° C. to give a dimethylpolysiloxane having a degree of polymerization of about 10, of which one of the terminal groups was a trimethyl silyl group and the other was a dimethyl hydroxy silyl group.

In the next place, 196.5 g (1 mole) of dimethyl 4-vinylphenyl chlorosilane were added dropwise to the above prepared one-end silanol-terminated dimethylpolysiloxane followed by the addition of 303 g of triethylamine as a hydrogen chloride acceptor and the mixture was agitated for 5 hours at 50° C. The reaction mixture was freed from the precipitated salt by washing with water and dried to give 780 g of a one-end functional dimethylpolysiloxane having a viscosity of 10 centipoise, referred to as the Siloxane I hereinbelow, which could be identified from the results of the infrared absorption spectroscopy and NMR measurement to be expressed by the formula

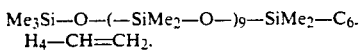

in which Me is a methyl group.

PREPARATION OF ORGANOPOLYSILOXANE II

The procedure was substantially the same as in the preparation of the Siloxane I described above except that the amount of the hexamethyl cyclotrisiloxane was increased to 4440 g (20 moles). The thus obtained product, referred to as the Siloxane II hereinbelow, had a viscosity of 120 centipoise and could be expressed by the formula

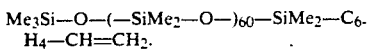

PREPARATION OF ORGANOPOLYSILOXANE III

The procedure was substantially the same as in the preparation of the Siloxane II described above excepting replacement of 196.5 g (1 mole) of dimethyl 4-vinylphenyl chlorosilane with 372.5 g (1 mole) of tris(4-vinylphenyl) chlorosilane. The thus obtained product, referred to as the Siloxane III hereinbelow, had a viscosity of 150 centipoise and could be expressed by the formula

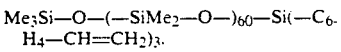

EXAMPLE 1

An organopolysiloxane-containing composition, referred to as the Composition I hereinbelow, was prepared by uniformly blending 20 parts of the Siloxane I and 80 parts of a polymeric acrylate compound (Aronix M 7200, a product by Toa Gosei Kagaku Co.), which is a polymeric ester of a polyhydric alcohol with a dibasic carboxylic acid esterified with acrylic acid, and the composition was evenly applied to the surface of a sheet of polyethylene-laminated paper in a coating thickness of about 0.8 μm. The thus coated surface of the sheet was irradiated with electron beams by using a low-energy electron accelerator (Model Electrocurtain CB20d 50/30, manufactured by Energy Science Industry Co.) in an atmosphere of nitrogen gas in a dose of 2 Mrad to give a fully cured coating layer having surface-releasability and firmly adhering to the substrate surface. The performance of this cured coating layer was evaluated in the following testing procedures. Test I. Peeling resistance of adhesive tape The surface releasability of the thus obtained coating layer was evaluated by the measurement of the peeling resistance of a pressure-sensitive adhesive tape bonded to the surface. Thus, a pressure-sensitive adhesive tape (Lumirror 31B Tape, a product by Nitto Denko Co.) was applied and bonded to the surface and kept standing for 3 days under a load of 20 g/cm² at 25° C. Thereafter, the adhesive tape was peeled off from the surface of the cured layer of the composition at the 180° direction by using an automatic tensile tester to record the peeling resistance in g per 5 cm width of the tape. The thus obtained value was 100 g/5 cm.

The same peeling test of the adhesive tape as above was concurrently undertaken except that the adhesive tape bonded to the releasing surface was subjected to aging by keeping for 3 days at 70° C. under a load of 20 g/cm² to obtain a value of 105 g/5 cm indicating that the surface releasability was stable by aging. Test II. Adhesiveness retention of adhesive tape The pressure-sensitive adhesive tape taken by peeling from the releasing surface after keeping at 70° C. for 20 hours under a load of 20 g/cm² was applied and bonded to a well-polished surface of a stainless steel plate and peeled off therefrom to record the peeling resistance. The same test as above by using the adhesive tape was repeated excepting replacement of the release paper sheet prepared by curing the releasing composition with a clean Teflon plate to record the peeling resistance. The ratio of the former value of the peeling resistance to the latter value was taken as a measure of the adhesiveness retention. The value was 97% in this case. A larger value obtained in this test means that curing of the releasing composition is more complete leaving a smaller amount of the uncured silicone constituent which might be transferred to the adhesive surface to decrease the adhesiveness of the surface.

Separately, the Composition I was admixed with 4% by weight of benzoin isobutyl ether as a photopolymerization initiator to give a photocurable composition which was applied to the surface of a sheet of polyethylene-laminated paper in a thickness of about 2 μm. The thus coated surface was exposed in air for 0.8 second to ultraviolet light by using two high-pressure mercury lamps of each 2 kilowatts or 80 watts/cm output at a distance of 8 cm so that the coating layer was fully cured with good adhesion to the substrate surface. The results of the tests for the peeling resistance before aging and adhesiveness retention of the pressure-sensitive adhesive tape were 93 g/5 cm and 95%, respectively, on the releasing surface.

EXAMPLE 2

Compositions were prepared by blending the Siloxane II and the same acrylate compound Aronix M7200 as used in Example 1 in the weight proportions indicated in Table 1 and each of the compositions was subjected to the curing test by the electron beam irradiation in the same manner as in Example 1 in a dose of 2 to 5 Mrad shown in the table and then to the releasing test also in the same manner as in Example 1. A comparative test was also undertaken by using the acrylate compound alone without admixture of the Siloxane II. A fully cured coating layer could be obtained though with poor surface releasability. The results of the tests are shown in the table which also shows the results of the surface slipperiness of the releasing surface measured in the following procedure.

TEST III. SLIPPERINESS OF CURED SURFACE

A block of urethane rubber was mounted on the horizontal surface of a cured layer of the composition obtained in the same manner as in the peeling resistance test described above under a load of 200 g and the rubber block was pulled in the horizontal direction to record the force required for moving. The result was given as the ratio of this value to 200 g as an apparent coefficient of dynamic friction.

EXAMPLE 3

The same experiment as in Example 1 was repeated excepting replacement of the Siloxane I with the Siloxane III. The results of the peeling resistance test before aging and the adhesiveness retention test were 50 g/5 cm and 95%, respectively.

EXAMPLE 4

The Composition I prepared in Example 1 was applied to the surface of a biaxially-oriented polypropylene film, poly(ethylene terephthalate) film and aluminum foil in a thickness of about 0.8 μm and the coating layer was cured by the electron beam irradiation in a dose of 2 Mrad in the same manner as in Example 1 to be fully cured. Adhesion of the cured layer to the substrate surface was quite satisfactory on each substrate. The results of the peeling resistance test on these three substrates before aging were 43 g/5 cm, 31 g/5 cm and 25 g/5 cm, respectively.

TABLE 1

| Mixing ratio, by weight | 20:80 | 10:90 | 5:95 | 0:100 |
|---|---|---|---|---|
| Irradiation dose, Mrad | 5 | 3 | 2 | 2 |
| Peeling resistance, g/5 cm | | | | |
| As cured | 10 | 30 | 100 | >1300 |
| After aging | 11 | 32 | 110 | >1300 |
| Adhesiveness retention, % | 90 | 93 | 94 | 100 |
| Slipperiness | 0.25 | 0.2 | 0.4 | 0.5 |

What is claimed is:

1. A radiation-curable organopolysiloxane-containing composition which comprises, as a uniform mixture:
   (a) from 0.1 to 20 parts by weight of an organopolysiloxane of a linear molecular structure having one, two or three of vinylphenyl or isopropenylphenyl groups bonded to only one of the silicon atoms at the molecular chain ends thereof; and
   (b) from 90.9 to 80 parts by weight of a (meth)acrylate compound represented by the general formula $(CH_2=CR^2-CO-O-)_\alpha R^1$, in which $R^2$ is a hydrogen atom or a methyl group, $R^1$ is an α-valent group formed from a molecule of a polyhydric alcohol, ester of a polyhydric alcohol with a polybasic carboxylic acid or partial ester of a polyhydric alcohol with a fatty acid by removing α in number of the hydrogen atoms of the alcoholic hydroxy groups and α is an integer of 1 to 6.

2. The radiation-curable organopolysiloxane-containing composition as claimed in claim 1 in which the vinylphenyl and isopropenylphenyl group is a 4-vinylphenyl and 4-isopropenylphenyl group, respectively.

3. The radiation-curable organopolysiloxane-containing composition as claimed in claim 1 in which the organopolysiloxane as the component (a) has a degree of polymerization in the range from 3 to 100.

4. The radiation-curable organopolysiloxane-containing composition as claimed in claim 3 in which the organopolysiloxane as the component (a) has a degree of polymerization in the range from 9 to 60.

5. The radiation-curable organopolysiloxane-containing composition as claimed in claim 1 which further comprises a photopolymerization initiator.

6. The radiation-curable organopolysiloxane-containing composition as claimed in claim 1 in which the amounts of the components (a) and (b) are in the ranges from 3 to 10 parts by weight and from 97 to 90 parts by weight, respectively.

* * * * *